United States Patent
Buchecker et al.

[11] Patent Number: 6,120,859
[45] Date of Patent: Sep. 19, 2000

[54] POLYMERISABLE, OPTICALLY ACTIVE DIOXOLANE DIESTERS

[75] Inventors: Richard Buchecker, Zurich; Teodor Lukac, Basel, both of Switzerland; Klaus Schmitt, Lörrach, Germany; Alois Villiger, Basel, Switzerland

[73] Assignee: Rolic AG, Zug, Switzerland

[21] Appl. No.: 09/451,754

[22] Filed: Dec. 1, 1999

Related U.S. Application Data

[63] Continuation of application No. PCT/IB98/00833, May 29, 1998.

[30] Foreign Application Priority Data

Jun. 2, 1997 [EP] European Pat. Off. .............. 97108745

[51] Int. Cl.[7] .......................... C09K 19/34; C09K 19/38; C09K 19/36; C07D 317/32

[52] U.S. Cl. ................ 428/1.1; 252/299.01; 252/299.61; 252/299.7; 549/430; 549/448; 549/472; 549/473; 549/499

[58] Field of Search ........................... 252/299.01, 299.2, 252/299.61, 299.7; 549/430, 448, 472, 473, 499; 349/106, 96; 428/1.1

[56] References Cited

U.S. PATENT DOCUMENTS

| | | | |
|---|---|---|---|
| 5,498,367 | 3/1996 | Buchecker et al. | 252/299.61 |
| 5,637,255 | 6/1997 | Kelly et al. | 252/299.61 |
| 5,681,504 | 10/1997 | Buchecker et al. | 252/299.61 |

FOREIGN PATENT DOCUMENTS

| | | |
|---|---|---|
| 0 441 213 A2 | 1/1991 | European Pat. Off. . |
| 0 675 188 A1 | 3/1995 | European Pat. Off. . |
| 2 298 202 | 8/1996 | United Kingdom . |

OTHER PUBLICATIONS

Liquid Crystals, vol. 22 N° 4, pp. 451–457, V P Shibaev et al., "Novel atropoisomeric binaphthyl–containing liquid crystalline copolymers forming chiral nematic phases", 1997.

*Primary Examiner*—Shean C. Wu
*Attorney, Agent, or Firm*—Finnegan, Henderson, Farabow, Garrett & Dunner, L.L.P.

[57] ABSTRACT

Polymerisable optically active compounds have the general formula:

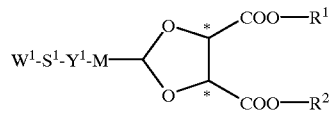

I where:

$W^1$ denotes a polymerisable residue, $S^1$ denotes a spacer unit, $Y^1$ denotes a single bond, or one of the groups —O—, —COO—, —OOC—, —OCOO—, —S—, —CONH— or —NHCO—, M denotes a divalent mesogenic group, and $R^1$ and $R^2$ denote straight chain, branched or cyclic alkyl groups with up to 8 carbon atom.

14 Claims, No Drawings

POLYMERISABLE, OPTICALLY ACTIVE DIOXOLANE DIESTERS

This application is a continuation of International Application No. PCT/IB98/00833, filed May 29, 1998, the content of which is incorporated herein by reference.

This invention relates to polymerisable, optically active dioxolane diesters, liquid crystalline mixtures which contain such compounds, and their use in the polymerised state as optical components.

Using orientation layers or under the influence of external fields, polymerisable liquid crystals which are provided with a photoinitiator can be orientated on a substrate or in cells, and then polymerised in this state by irradiation with light of a suitable wavelength. The resultant chemically fixed structure is retained, even at high temperatures.

The present invention relates to polymerisable chiral dopants and liquid crystal cholesteric mixtures containing them. In the liquid crystal layer these dopants induce a helix structure. In the homogeneously orientated state of such a layer (Grandjean texture), light is split into its left- and right-circular polarised components within a specific wavelength range (selective reflection range). where one of the circularly polarised components is fully reflected and the other is transmitted unattenuated, depending on the direction of rotation of the cholesteric helix structure. Light outside the selective reflection range is transmitted uninfluenced. The position of the reflection band in the spectrum is determined by the pitch of the cholesteric helix, the width of the band being correlated with the double refraction (birefringence) of the material. Layers with these optical properties are ideal media for a wide range of applications including colour filters, optical pass band filters and polarisers.

The polymerisable dopants must after polymerisation exhibit good chemical and thermal stability, good solubility in conventional solvents, and good stability to electrical fields and electromagnetic radiation. When mixed with nematic compounds, they should possess a cholesteric mesophase in a temperature range from approx. 10° C. to approx. 100° C., and particularly from approx. 25° C. to approx. 80° C.

Since liquid crystals are generally used as mixtures, it is important for the individual components to be satisfactorily intermiscible. Mixtures consisting of polymerisable liquid crystals and non-polymerisable optically active usually lead to relaxation phenomena, e.g. temperature dependence of pitch and reduction of the stability of the network. On the other hand, conventional optically active photochemically oligomerisable or polymerisable additives exhibit only a relatively low twisting power.

The objective is therefore to produce photochemically polymerisable optically active compounds, particularly for use in optical filters, these compounds having a high twisting power. They can be added to liquid crystalline mixtures in sufficient concentrations to achieve the required pitch without greatly impairing the clearing point or other physical properties of the mixture. For this purpose it should be possible to manufacture them easily and cheaply from commercially available raw materials or other known raw materials. Furthermore, it should be possible to orientate and structure mixtures which contain such optically active polymerisable compounds, free from domains wherever possible, and these mixtures should also have excellent thermal and long-term stability in the crosslinked state.

EP-A-0441213 and EP-A-0675188 (both Hoffmann-La Roche Inc.) describe optically active, but not polymerisable, dioxolane diesters. They can be manufactured simply from cheap tartaric acid diesters, have relatively low viscosity, are readily soluble and induce small pitches in liquid crystal mixtures. GB-A-2298202 (Merck Patent GmbH) and *Liq. Cryst.* 22, 451 (1997) (Schibaev et al.) describe atropisomeric 2,2'-disubstituted 1,1'-binaphthyl derivatives with a polymerisable group which induce very high twisting movements, but whose manufacture (from an optically active 1,1'-binaphth-2-ol) is prohibitively expensive.

The polymerisable or photo-crosslinkable optically active dioxolane diesters of Formula I, according to the invention, surprisingly meet the established requirements. They are either liquid crystalline themselves or lead to only small phase depressions when added to liquid crystalline compounds or mixtures. They induce very high twisting movements, are very stable and readily soluble, with low viscosity, and can be easily manufactured from very cheap, optically active raw materials. They have the following general formula:

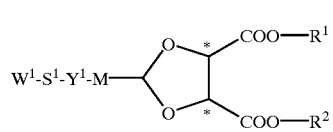

I where:
W$^1$ denotes polymerisable groups with the structure CH$_2$=Ch—, CH$_2$=CH—Ph—, CH$_2$=CH—COO—, CH$_2$=C(CH$_3$)—COO—, CH$_2$=C(Cl)—COO—, CH$_2$=C(Ph)—COO—, CH$_2$=CH—COOPh—, CH$_2$=CH—CO—NH—, CH$_2$=CH—CO—NCH$_3$—, CH$_2$=C(CH$_3$)—CONH—, CH$_2$=C(CH$_3$)—CONHCH$_3$—, CH$_2$=C(Cl)—CONH—, CH$_2$=C(Ph)—CONH—, CH$_2$=CH—O—, CH$_2$=CH—OOC—, (Ph)—CH=CH— or

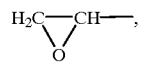

where:
(Ph) denotes phenyl, and
Ph denotes 1,4-phenylene;
S$^1$ denotes a spacer unit, such as any straight chain or branched alkylene group containing 2 to 20 C atoms, optionally substituted singly or multiply with fluorine and/or singly with chlorine or cyano, which unit can also be interrupted singly or doubly by —O—, —COO—, —OOC—, —CH=CH—, —C≡C—, —NH—, —NCO— and/or —CONH—;
Y$^1$ denotes a single bond or one of the groups —O—, —COO—, —OOC—, OCOO—, —S—, —CONH— or —NHCO—;
M denotes a divalent mesogenic group of Formula (a):

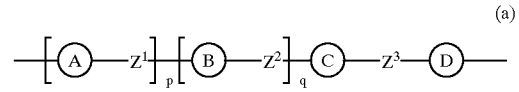

(a)

where:
rings A, B, C, D denote, independently, unsubstituted 1,4-phenylene or trans-1,4-cyclohexylene, and/or 1,4-phenylene substituted singly or multiply with fluorine, and/or singly with chlorine, alkyl, alkoxy, fluorinated alkyl, fluorinated alkoxy, alkenyl, alkenyloxy or cyano, and/or one of rings A, B, C, D also denotes unsubstituted pyridine-2,5-diyl, pyrimidine-2,5-diyl, pyrazine-2,5-diyl, thiophene-2,5-diyl or 2,6-naphthylene;

$Z^1$, Z and $Z^3$ denote, independently, a single bond, —COO—, —OOC—, —C≡C—, —CH$_2$O—, —OCH$_2$—, —(CH$_2$)$_3$O—, —O(CH$_2$)$_3$—, —(CH$_2$)$_2$— or —(CH$_2$)$_4$—; and p and q denote, independently, 0 or 1; and $R^1$ and $R^2$ denote a straight chain, branched or cyclic alkyl group containing up to 8 carbon atoms.

The above-mentioned alkyl, alkoxy, alkenyl and alkenyloxy substituents of rings A, B, C and D have a maximum of 5, preferably a maximum of 3, carbon atoms.

Fluorinated alkyl or alkoxy residues are alkyl or alkoxy residues in which the hydrocarbon residues are substituted singly or multiply with fluorine, e.g. trifluoromethyl, difluoro-methyl, 1- or 2-fluoroethyl, 1-, 2- or 3-fluoropropyl, 1-, 2- or 3-fluoropropoxy, 2,2- or 3,3-difluoropropoxy, 3,3,3-trifluoropropoxy.

Examples of substituted 1,4-phenylene residues are 2,3-difluoro-1,4-phenylene, 2,5-difluoro-1,4-phenylene, 2,6-difluoro-1,4-phenylene or 1,4-phenylene with one of the following substituents in position 2 or 3: fluorine, chlorine, methyl, ethyl, propyl, isopropyl, allyl, trifluoromethyl, methoxy, ethoxy, propoxy, isopropoxy, allyloxy or cyano.

Preferred compounds according to the invention are those with the general formula IA:

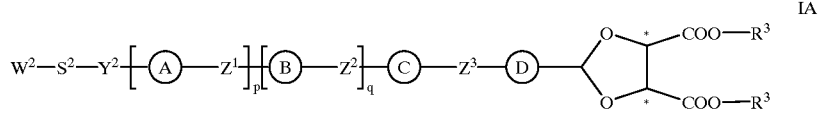

where:

$W^2$ denotes polymerisable groups with the structure CH$_2$=CH—, CH$_2$=CH—COO—, CH$_2$=C(CH$_3$)—COO—, CH$_2$=C(Cl)—COO—, CH$_2$=CH—CO—NH—, CH$_2$=C(CH$_3$)—CONH—, CH$_2$=CH—O—, CH$_2$CH—OOC— or

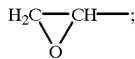

$S^2$ denotes any straight chain or branched alkylene group containing 2 to 20 C atoms, substituted singly or multiply with fluorine and/or singly with chlorine or cyano, which group may also be interrupted singly or doubly by —O—, —COO—, —OOC—, —CH=CH— and/or —C≡—C;

$Y^2$ denotes a single bond, —O—, —COO— or —OOC—;

$R^3$ denotes a straight chain or branched alkyl group containing 1 to 5 carbon atoms, and $Z^1$, $Z^2$, $Z^3$, p, q and rings A, B, C and D have the meaning given for formula (a).

Compounds more especially preferred according to the invention are those with the general formula IA, where:

$W^2$ denotes CH$_2$=CH—COO— or CH$_2$=C(CH$_3$)—COO—;

$S^2$ denotes a straight chain alkylene group containing 2 to 12 C atoms, which may also be interrupted singly or doubly by —O—;

A, B, C, D denote, independently, unsubstituted 1,4-phenylene or trans-1,4-cyclo-hexylene, and/or 1,4-phenylene substituted singly or multiply with fluorine, and/or singly with chlorine, methyl, methoxy or cyano, and/or, one of the rings A, B, C, D also denotes unsubstituted pyridine-2,5-diyl, pyrimidine-2,5-diyl, pyrazine-2,5-diyl, thiophene-2,5-diyl or 2,6-naphthylene;

$Z^1$, $Z^2$ and $Z^3$ denote, independently, a single bond, —COO—, —OOC—, —CH$_2$O—, —OCH$_2$—, —(CH$_2$)$_2$— or —C≡C—, and $Y^2$, $R^3$, p and q have the meaning indicated for Formula IA.

The optically active tartaric acid derivatives of Formula I are easily obtained by acid catalysed cyclocondensation of an aldehyde A:

or a derivative of this, such as a dialkyl or alkylene acetal, with an L- or D-tartaric acid derivative B:

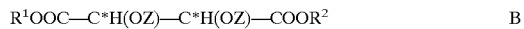

where OZ stands for hydroxy or for trimethylsilyloxy or another activated hydroxyl derivative, and where $R^1$, $R^2$, $W^1$, $S^1$ and $Y^1$ have the above-mentioned meaning.

Different methods are known from the literature. For example, an aldehyde A may be converted to compounds of Formula I with an R,R- or S,S-2,3-bis(trimethylsilyloxy)-succinic acid dialkyl ester, e.g. with catalytic quantities of boron trifluoride diethyl etherate and trifluoromethanesulphonic acid. A further method consists in the reaction of aldehyde A with an orthoformic acid trialkyl ester with catalytic quantities of a strong acid, such as p-toluenesulphonic acid in an inert solvent, such as toluene, and re-acetylisation of the dialkyl acetal formed in the boiling heat with B (R=H), under azeotropic distillation of the corresponding low boiling alkanol. Finally, an aldehyde A can also be converted directly to I with an dialkyl L- or D-tartrate in the presence of an acid, such as oxalic acid, and a water-binding agent, such as magnesium sulphate, in a boiling inert solvent such as benzene. To avoid polymerisation of the W group an inhibitor, such as hydroquinone or 2,6-di-t-butyl-4-cresol (BHT), is added during the reaction.

The aldehydes A are known compounds or analogues of known compounds. The tartaric acid derivatives B are either commercially available or can be easily manufactured from tartaric acid or commercial tartaric acid derivatives.

The polymerisable optically active compounds according to the invention, with the general formula I, are preferably used in mixtures with one or more optically inactive polymerisable liquid crystalline compounds. The proportion of the optically active tartaric acid derivatives of Formula I in such mixtures may vary within a wide range and may amount, for example, to 1 to 80% by weight, preferably 2 to 50% by weight. Suitable optically inactive polymerisable liquid crystalline compounds are, for example, those of Formula II which incorporate two polymerisable groups or those of Formula III incorporating only one polymerisable group:

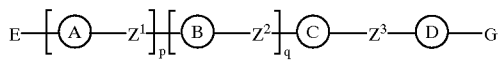

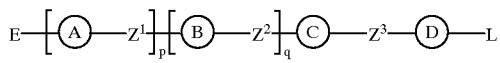

where

E and G denote, independently, $W^1$—$S^1$—$Y^1$, in which $W^1$, $S^1$ and $Y^1$ have the meaning indicated in Formula I;

L denotes hydrogen, fluorine, chlorine, cyano, nitro or a straight chain or branched alkyl group containing 1 to 20 carbon atoms, where one or more non-adjacent and non-end-position methylene groups may be replaced by —O—, —COO—, —OOC—, —S—, —CH=CH— and/or —C≡C—, one or more hydrogens may be replaced by fluorine, and/or a hydrogen may be replaced by halogen or cyano; and where A, B, C, D, $Z^1$, $Z^2$, $Z^3$, p and q have the meaning indicated in Formula IA.

The three methods described in the following are suitable, for example, for manufacturing selectively reflecting cholesteric polymer layers.

In a first method the chiral components are dissolved in the mixture of (optically inactive) nematic matrix components after the addition of an inhibitor, e.g. 2,6-di-t-butyl-4-cresol (BHT), and a photoinitiator, and are stirred at temperatures above the clearing point, so that a homogeneous mixture results. This is applied to the heated substrate provided with an orientating polyimide layer by coating below the clearing point. The coating induces in the layer the required helical orientation, which can be further improved by tempering at temperatures below the clearing point. After orientation, the layer is crosslinked in vacuo or under inert gas with UV light, thereby chemically fixing the helical structure.

Alternatively the mixture can be filled in at a higher temperature by capillary action in liquid crystal cells consisting of glass sheets provided with orientation layers. When the mixture is cooled below the clearing point, the cholesteric orientation is formed. This can be fixed by crosslinking with UV light.

A further method consists in dissolving the components mentioned in a solvent and applying the solution to substrates by known methods, such as immersion or centrifuging. In this case the helical structure is established when the solvent evaporates, and can be influenced by appropriate selection of the temperature and drying rate. After orientation, the remaining solvent is removed in vIcuo and the layer irradiated with UV light. The application of such a solution by means of a coating device produces orientated layers, too.

The polymerisable tartaric acid derivatives of Formula I, according to the invention, are further illustrated by Examples 1 and 2. Example 3 shows the selected reflection of individual compounds I in a (non-polymerisable) nematic test mixture. The three methods for manufacturing a selectively reflecting, uniformly orientated cholesteric network are exemplified in Examples 4 to 6.

EXAMPLE 1

(4R,5R)-2-[4'-(6-acryloxyhexyloxy)biphenyl-4-yl]-1,3-dioxolane-4,5-dicarboxylic acid diethyl ester A solution of 0.706 g of 4'-(6-acryloxyhexyloxy)biphenyl-4-carboxaldehyde, 1 ml of orthoformic acid tri-ethyl ester, 0.7 ml of diethyl L-tartrate, 27 mg of BHT, 6.8 mg of 4-toluenesulphonic acid monohydrate and 10 ml of toluene was allowed to stand for 1 hour at room temperature, then heated for 2.5 hours to boiling, the solvent being distilled off and replaced by fresh toluene. After the addition of 3 drops of triethylamine and cooling, it was diluted with diethyl ether, washed with water, dried over sodium sulphate, filtered and concentrated at 40° C. in vacuo. The oily residue was chromatographed on 45 g of silica gel with hexane/ethyl acetate 4:1. Recrystallisation from ethyl acetate resulted in 0.18 g (4R,5R)-2-[4-(6-acryloxyhexyloxy)biphenyl-4-yl]-1,3-dioxolane-4,5-dicarboxy acid diethyl ester; boiling point (C-I) 65° C.

The 4'-(6-acryloxyhexyloxy)biphenyl-4-carboxaldehyde used as the raw material was manufactured as follows:

a) A solution of 136.6 g of N,N'-dicyclohexylcarbodiimide in 240 ml of dichloromethane was dropped into a solution of 56 ml of 6-chlorohexanol, 39.5 ml of acrylic acid and 2.94 g of 4-dimethylaminopyridine in 400 ml of dichloromethane, over 80 minutes at 0° C. The reaction mixture was stirred for a further 15 minutes at 0° C. and allowed to stand overnight at room temperature. The suspension was filtered, the residue washed with dichloromethane and the filtrate concentrated. The partially solid residue was made into a paste in 300 ml of hexane and filtered, the residue washed three times with 50 ml of hexane on each occasion, and the filtrate concentrated. Chromatography of the residue on 830 g of silica gel with hexane/ethyl acetate 49:1, later 24:1, resulted in 53.1 g 6-chlorohexyl acrylate as a colourless oil.

b) A mixture of 1.0 g of 4'-hydroxybiphenyl-4-carboxaldehyde, 1.1 g of 6-chlorohexyl acrylate, 0.083 g of potassium iodide, 1.05 g of pulverised potassium carbonate and 15 ml of dimethyl sulphoxide was heated for 21 hours to 75° C. After cooling, it was poured into water and extracted with diethyl ether. The organic phase was washed with water until it was neutral, dried over sodium sulphate, filtered and concentrated.

Chromatography of the residue on 45 g of silica gel with toluene/acetone 49:1 resulted in 1.46 g of 4'-(6-acryloxyhexyloxy)biphenyl-4-carboxaldehyde; boiling point 53.2–54.5° C.

The following compounds may be similarly manufactured:

(4R,5R)-2-[4'-(6-acryloxyhexyloxy)biphenyl-4-yl]-1,3-dioxolane-4,5-dicarboxylic acid dimethyl ester;

(4R,5R)-2-[4'-(6-acryloxyhexyloxy)biphenyl-4-yl]-1,3-dioxolane-4,5-dicarboxylic acid dipropyl ester;

(4R,5R)-2-[4'-(6-acryloxyhexyloxy)biphenyl-4-yl]-1,3-dioxolane-4,5-dicarboxylic acid diisopropyl ester, boiling point (C-I) 66° C.;

(4R,5R)-2-[4'-(6-acryloxyhexyloxy)biphenyl-4-yl]-1,3-dioxolane-4,5-dicarboxylic acid dibutyl ester, boiling point (C-I) 41.5° C.;

(4S,5S)-2-[4'-(6-acryloxyhexyloxy)biphenyl-4-yl]-1,3-dioxolane-4,5-dicarboxylic acid dibutyl ester;

(4R,5R)-2-[4'-[trans-4-(5-acryloxypentyl)cyclohexyl]biphenyl-4-yl]-1,3-dioxolane-4,5-dicarboxylic acid diethyl ester, boiling point (C-$S_A$) 72.8° C., clearing point ($S_A$-I) 78° C.;

(4R,5R)-2-[4'-[trans-4-(5-acryloxypentyl)cyclohexyl]biphenyl-4-yl]-1,3-dioxolane-4,5-dicarboxylic acid dibutyl ester;

(4R,5R)-2-{4'-[trans-4-(6-acryloxyhexyl)cyclohexyl]biphenyl-4-yl}-1,3-dioxolane-4,5-dicarboxylic acid diethyl ester, boiling point (C-$S_A$) 51° C., clearing point ($S_A$-I) 82° C.;

(4S,5S)-2-{4'-[trans-4-(6-acryloxyhexyl)cyclohexyl]
biphenyl-4-yl}-1,3-dicarboxylic acid diethyl ester;

(4S,5S)-2-{4'-[trans-4-(6-acryloxyhexyl)cyclohexyl]
biphenyl-4-yl}-1,3-dicarboxylic acid dibutyl ester;

(4R,5R)-2-[4"-(6-acryloxyhexyloxy)-[1,1'; 4', 1"]terphenyl-4-yl]-1,3-dioxolane-4,5-dicarboxylic acid diethyl ester;

(4R,5R)-2-[4"-(6-acryloxyhexyloxy)-[1,1'; 4', 1"]terphenyl-4-yl]-1,3-dioxolane-4,5-dicarboxylic acid dibutyl ester;

(4R,5R)-2-{4-(4-[4-(6-acryloxyhexyloxy)benzoyloxy]
phenyloxycarbonyl)phenyl}-1,3-dioxolane-4,5-dicarboxylic acid diethyl ester, boiling point (C-S$_A$) 98° C., clearing point (S$_A$-I) 99° C.;

(4R,5R)-2-{4-{4-trans-4-{4-[4-(6-acryloxyhexyloxy)
benzoyloxy]phenyl}cyclohexyloxy carbonyl}phenyl}-1,3-dioxolane-4,5-dicarboxylic acid dibutyl ester;

(4R,5R)-2-{4-[4-(6-acryloxyhexyloxy)phenethynyl]
phenyl}-1,3-dioxolane-4,5-dicarboxylic acid diethyl ester;

(4R,5R)-2-{4-[4'-(6-acryloxyhexyloxy)biphenyl-4-yl]
ethynylphenyl}-1,3-dioxolane-4,5-dicarboxylic acid dibutyl ester;

(4R,5R)-2-{[4-[trans-4-(6-acryloxyhexyl)cyclohexyl]
phenethynyl]phenyl}-1,3-dioxolane-4,5-dicarboxylic acid dibutyl ester;

(4R,5R)-2-[4-(6-acryloxyhexyloxy)naphth-2-yl]phenyl}-1,3-dioxolane-4,5-dicarboxylic acid diethyl ester;

(4R,5R)-2-{4-[5-(6-acryloxyhexyl)pyridine-2-yl]phenyl}-1,3-dioxolane-4,5-dicarboxylic acid diethyl ester;

(4R,5R)-2-{4-[5-(6-acryloxyhexyl)pyrimidine-2-yl]
phenyl}-1,3-dioxolane-4,5-dicarboxylic acid diethyl ester;

(4R,5R)-2-{4-[5-(6-acryloxyhexyl)pyrazine-2-yl]phenyl}-1,3-dioxolane-4,5-dicarboxylic acid diethyl ester;

(4R,5R)-2-{4-[5-(6-acryloxyhexyl)thien-2-yl]phenyl}-1,3-dioxolane-4,5-dicarboxylic acid diethyl ester;

(4R,5R)-2-{4'-{[trans-4-(6-acryloxyhexyl)cyclohexyl]
methoxy}biphenyl-4-yl}-1,3-dioxolane-4,5-dicarboxylic acid dibutyl ester;

(4R,5R)-2-{4'-{[trans-4-(6-acryloxyhexyl)cyclohexyl]
propoxy}biphenyl-4-yl}-1,3-dioxolane-4,5-dicarboxylic acid dibutyl ester;

(4R,5R)-2-{4'-{[trans-4-(6-acryloxyhexyl)cyclohexyl]
ethyl}biphenyl-4-yl}-1,3-dioxolane-4,5-dicarboxylic acid dibutyl ester;

(4R,5R)-2-{4'-{[trans-4-(6-acryloxyhexyl)cyclohexyl]
butyl}biphenyl-4-yl}-1,3-dioxolane-4,5-dicarboxylic acid dibutyl ester;

(4R,5R)-2-{4'-[trans-4-(6-acryloxyhexyl)cyclohexyl]
biphenyl-4-yl}-1,3-4,5-dicarboxylic acid dibutyl ester;

(4R,5R)-2-[4'-(6-methacryloxyhexyloxy)biphenyl-4-yl]-1,3-dioxolane-4,5-dicarboxylic acid dimethyl ester;

(4R,5R)-2-[4'-(6-methacryloxyhexyloxy)biphenyl-4-yl]-1,3-dioxolane-4,5-dicarboxylic acid diethyl ester;

(4R,5R)-2-[4'-(6-methacryloxyhexyloxy)biphenyl-4-yl]-1,3-dioxolane-4,5-dicarboxylic acid dipropyl ester;

(4R,5R )-2-[4'-(6-methacryloxyhexyloxy)biphenyl-4-yl]-1,3-dioxolane-4,5-dicarboxylic acid diisopropyl ester;

(4R,5)-2-[4'-(6-methacryloxyhexyloxy)biphenyl-4-yl]-1,3-dioxolane-4,5-dicarboxylic acid dibutyl ester;

(4R,5R)-2-{4'-[trans-4-(5-methacryloxypentyl)cyclohexyl]
biphenyl-4-yl}-1,3-dioxolane-4,5-dicarboxylic acid diethyl ester;

(4R,5R)-2-{4'-[trans-4-(5-methacryloxypentyl)cyclohexyl]
biphenyl-4-yl}-1,3-dioxolane-4,5-dicarboxylic acid dibutyl ester;

(4R,5R)-2-{4'-[trans-4-(6-methacryloxyhexyl)cyclohexyl]
biphenyl-4-yl}-1,3-dioxolane-4,5-dicarboxylic acid diethyl ester;

(4R,5R)-2-{4'-[trans-4-(6-methacryloxyhexyl)cyclohexyl]
biphenyl-4-yl}-1,3-dioxolane-4,5-dicarboxylic acid dibutyl ester;

(4R,5R)-2-[4'-(6-methacryloxyhexyloxy)biphenyl-4-yl]-1,3-dioxolane-4,5-dicarboxylic acid diethyl ester;

(4R,5R)-2-{4'-[trans-4-(6-methacryloxyhexyl)cyclohexyl]
biphenyl-4-yl}-1,3-dioxolane-4,5-dicarboxylic acid diethyl ester;

(4R,5R)-2-{4'-[6-(2-chloroacryloxy)hexyloxy]biphenyl-4-yl}-1,3-dioxolane-4,5-dicarboxylic acid diethyl ester;

(4R,5R)-2-{4'-[6-(2-chloroacryloxy)hexyl]biphenyl-4-yl}-1,3-dioxolane-4,5-dicarboxylic acid diethyl ester;

(4R,5R)-2-[4'-(6-acrylaminohexyloxy)biphenyl-4-yl]-1,3-dioxolane-4,5-dicarboxylic acid diethyl ester;

(4R, 5R)-2-[4'-[trans-4-(6-acrylaminohexyl)cyclohexyl]
biphenyl-4-yl]-1,3-dioxolane-4,5-dicarboxylic acid diethyl ester;

(4R,5 R)-2-[4'-(6-methacrylaminohexyloxy)biphenyl-4-yl]-1,3-dioxolane-4,5-dicarboxylic acid diethyl ester, (4R,5R)-2-[4'-[trans-4-(6-methacrylaminohexyl)
cyclohexyl]biphenyl-4-yl]-1,3-dioxolane-4,5-dicarboxylic acid diethyl ester;

(4R,5R)-2-[4'-(7,8-epoxyoctyloxy)biphenyl-4-yl]-1,3-dioxolane-4,5-dicarboxylic acid ethyl ester;

(4R,5R)-2-{4'-[trans-4-(7,8-epoxyoctyl)cyclohexyl]
biphenyl-4-yl}-1,3-dicarboxylic acid diethyl ester;

(4R,5R)-2-(4'-oct-7-enyloxybiphenyl-4-yl)-1,3-dioxolane-4,5-dicarboxylic acid diethyl ester;

(4R,5R)-2-[4'-(trans-4-oct-7-enylcyclohexyl)biphenyl-4-yl]-1,3-dioxolane-4,5-dicarboxylic acid diethyl ester;

(4R,5R)-2-[4'-(6-vinyloxyhexyloxy)biphenyl-4-yl]-1,3-dioxolane-4,5-dicarboxylic acid diethyl ester;

(4R,5R)-2-{4'-[trans-4-(6-vinyloxyhexyl)cyclohexyl]
biphenyl-4-yl }-1,3-dioxolane-4,5-dicarboxylic acid diethyl ester;

(4R,5R)-2-[4'-(8-phenyl-(E)-oct-7-enyloxy)biphenyl-4-yl]-1,3-dioxolane-4,5-dicarboxylic acid diethyl ester;

(4R,5R)-2-{4'-[trans-4-(8-phenyl-(E)-oct-7-enyl)
cyclohexyl]biphenyl-4-yl}-1,3-dioxolane-4,5-dicarboxylic acid diethyl ester.

EXAMPLE 2

(4R,5R)-2-{4-[4'-(6-acryloxyhexyloxy)biphenyl-4-carbonyloxy]phenyl}-1,3-dioxolane-4,5-dicarboxylic acid diethyl ester;

A solution of 0.375 g of N,N'-dicyclohexylcarbodiimide in 9 ml of dichloromethane was dropped on to a mixture of 0.566 g of 4'-(6-acryloxyhexyloxy)biphenyl-4-carboxylic acid, 0.465] of (4R,5R)-2-(4-hydroxyphenyl)-1,3-dioxolane-4,5-dicarboxylic acid diethyl ester, 0.03 g of 4-dimethylaminopyridine, 0.018 g BHT and 30 ml of dichloromethane. The reaction mixture was allowed to stand overnight and filtered, and the filtrate concentrated. Chromatography of the residue on 20 g of silica gel with toluene/ethyl acetate 24:1 and twice recrystallisation from ethyl acetate resulted in 0.557 g of (4R,5R)-2-{4-[4'-(6-acryloxyhexyloxy)biphenyl-4-carbonyloxy]phenyl}-1,3-dioxolane-4,5-dicarboxylic acid diethyl ester, boiling point (C-N*) 93° C., clearing point (N*-I) 95.5° C.

The (4R,5R)-2-(4-hydroxyphenyl)-1,3-dioxolane-4,5-dicarboxylic acid diethyl ester used as the raw material was manufactured as follows:

a) A mixture of 6.4 g of 4-benzyloxybenzaldehyde, 12 ml of diethyl L-tartrate, 150 ml of benzene, 1.5 g of oxalic acid dihydrate and 20.4 g of magnesium sulphate was boiled for 2 days on the water separator. After cooling it was filtered and the filtrate washed with sodium hydrogen carbonate solution and with sodium chloride solution, dried over sodium sulphate, filtered and concentrated in vacuo. Chromatography of the residue (13.5 g) on 180 g of silica gel with hexane/ethyl acetate 4:1 resulted in 7.43 g of (4R,5R)-2-(4-benzyloxyphenyl)-1,3-dioxolane-4,5-dicarboxylic acid diethyl ester.

b) A solution of 7.4 g (4R,5R)-2-(4-benzyloxyphenyl)-1,3-dioxolane-4,5-dicarboxylic acid diethyl ester and 0.8 ml of triethylamine in 120 ml of toluene and 40 ml of ethanol was hydrogenated overnight with 1.1 g of 5% palladium carbon at room temperature and normal pressure. After filtration and evaporation of solvent, 5.60 g of (4R,5R)-2-(4-hydroxyphenyl)-1,3-dioxolane-4,5-dicarboxylic acid diethyl ester was obtained.

The following compounds can be similarly manufactured:

(4R,5R)-2-{4-[4-(6-acryloxyhexyloxy)benzoyloxy] phenyl}-1,3-dioxolane-4,5-dicarboxylic acid diethyl ester;

(4R,5R)-2-{4-[4-(7-acryloxyheptyloxy)benzoyloxy] phenyl}-1,3-dioxolane-4,5-dicarboxylic acid diethyl ester;

(4R,5R)-2-{4-[4-(8-acryloxyoctyloxy)benzoyloxy]phenyl}-1,3-dioxolane-4,5-dicarboxylic acid diethyl ester;

(4R,5R)-2-{4-{4-[trans-4-(3-acryloxypropyl)cyclohexyl] benzoyloxy}phenyl}-1,3-dioxolane-4,5-dicarboxylic acid diethyl ester;

(4R,5R)-2-{4-{-4-[trans-4-(3-acryloxypropyl)cyclohexyl] benzoyloxy}phenyl}-1,3-dioxolane-4,5-dicarboxylic acid diethyl ester, boiling point (C-I) 71.5° C., $S_A$-N* 51.0° C., clearing point (N*-I) 60.5° C.;

(4R,5R)-2-{4-{-4-[trans-4-(3-acryloxypropyl)cyclohexyl] benzoyloxy}phenyl}-1,3-dioxolane-4,5-dicarboxylic acid diisopropyl ester;

(4R,5R)-2-{4-{-4-[trans-4-(3-acryloxypropyl)cyclohexyl] benzoyloxy}phenyl}-1,3-dioxolane-4,5-dicarboxylic acid dibutyl ester, boiling point (C-I) 73.5° C., clearing point (N*-I) 41.5° C.;

(4R,5R)-2-{4-{4'-[trans-4-(4-acryloxybutyl)cyclohexyl] biphenyl-4-carbonyloxy}phenyl}-1,3-dioxolane-4,5-dicarboxylic acid diethyl ester;

(4R, 5R)-2-{4-{4'-[trans-4-(4-acryloxybutyl)cyclohexyl] biphenyl-4-carbonyloxy}phenyl}-1,3-dioxolane-4,5-dicarboxylic acid dibutyl ester;

(4R,5R)-2-{4-{4'-trans-5-(4-acryloxypentyl)cyclohexyl] biphenyl-4-carbonyloxy}-phenyl}-1,3-dioxolane-4,5-dicarboxylic acid diethyl ester, boiling point (C-$S_A$) 99.9° C., clearing point >160° C. (polymerised);

(4R,5R)-2-{4-{4'-[trans-4-(5-acryloxypentyl)cyclohexyl] biphenyl-4-carbonyloxy}-phenyl}-1,3-dioxolane-4,5-dicarboxylic acid dibutyl ester, boiling point (C-$S_A$) 60.8° C., clearing point ($S_A$-I) 159.5° C.;

(4R,5R)-2-{4-{4'-[trans-4-(6-acryloxyhexyl)cyclohexyl] biphenyl-4-carbonyloxy}-phenyl}-1,3-dioxolane-4,5-dicarboxylic acid diethyl ester;

(4R,5R)-2-{4-{4'-[trans-4-(6-acryloxyhexyl)cyclohexyl] biphenyl-4-carbonyloxy}-phenyl}-1,3-dioxolane-4,5-dicarboxylic acid dibutyl ester, boiling point (C-$S_A$) 92.7° C., $S_A$-N* 160° C., clearing point (N*-I) 165° C.;

(4R,5R)-2-{4-{4'-[trans-4-(7-acryloxyheptyl)cyclohexyl] biphenyl-4-carbonyloxy}-phenyl}-1,3-dioxolane-4,5-dicarboxylic acid diethyl ester;

(4R,5R)-2-{4-{4'-[trans-4-(7-acryloxyheptyl)cyclohexyl] biphenyl-4-carbonyloxy}-phenyl}-1,3-dioxolane-4,5-dicarboxylic acid dibutyl ester;

(4R,5R)-2-{4-{4'-[trans-4-(5-methacryloxypentyl) cyclohexyl]biphenyl-4-carbonyloxy}-phenyl}-1,3-dioxolane-4,5-dicarboxylic acid diethyl ester;

(4R,5R)-2-{4-{4'-[trans-4-(5-methacryloxypentyl) cyclohexyl]biphenyl-4-carbonyloxy}-phenyl}-1,3-dioxolane-4,5-dicarboxylic acid dibutyl ester;

(4R,5R)-2-{4-{4'-[trans-4-(6-methacryloxyhexyl) cyclohexyl]biphenyl-4-carbonyloxy}-phenyl}-1,3-dioxolane-4,5-dicarboxylic acid diethyl ester;

(4R,5R)-2-{4-{4'-[trans-4-(6-methacryloxypentyl) cyclohexyl]biphenyl-4-carbonyloxy}-phenyl}-1,3-dioxolane-4,5-dicarboxylic acid dibutyl ester;

(4R,5R))-2-{4-{4-[4-(6-acryloxyhexyloxy)benzoyloxy] phenyloxycarbonyl}phenyl}-1,3-dioxolane-4,5-dicarboxylic acid diethyl ester, boiling point (C-I) 98° C. clearing point (N*-I) 93° C.;

(4R,5R)-2-{4-{trans-4-[4-(6-acryloxyhexyloxy) benzoyloxy]cyclohexyl}phenyl}-1,3-dioxolane-4,5-dicarboxylic acid diethyl ester;

(4R,5R)-2-{4-{trans-4-[4-(6-acryloxyhexyloxy) benzoyloxy]cyclohexyl}phenyl}-1,3-dioxolane-4,5-dicarboxylic acid dibutyl ester, boiling point (C-I) 62° C., clearing point (N*-I) 50.8° C.;

(4R,5R)-2-{4-{trans-4-[4-(6-acryloxyhexyloxy)biphenyl-4-yl}-1,3-dioxolane-4,5-dicarboxylic acid dimethyl ester;

(4R,5R)-2-{4-{trans-4-[4-(6-acryloxyhexyloxy)biphenyl-4-yl}-1,3-dioxolane-4,5-dicarboxylic acid diethyl ester;

(4R,5R)-2-{4-{trans-4-[4-(6-acryloxyhexyloxy)biphenyl-4-yl}-1,3-dioxolane-4,5-dicarboxylic acid dibutyl ester;

(4R,5R)-2-{4'-[4-(5-acryloxypentyloxy)-2-fluorobenzoyloxy]biphenyl-4-yl}-1,3-dioxolane-4,5-dicarboxylic acid diethyl ester;

(4R,5R)-2-{4'-[4-(5-acryloxypentyloxy)-2,3-difluorobenzoyloxy]biphenyl-4-yl}-1,3-dioxolane-4,5-dicarboxylic acid diethyl ester;

(4R,5R)-2-{4'-[4-(6-acryloxyhexyloxy)-2-fluorobenzoyloxy]biphenyl-4-yl}-1,3dioxolane-4,5-dicarboxylic acid diethyl ester;

(4R,5R)-2-{4'-[4-(6-acryloxyhexyloxy)-2,3-difluorobenzoyloxy]phenyl-4-yl}-1,3-dioxolane-4,5-dicarboxylic acid diethyl ester;

(4R,5R)-2-{4'-[4-(6-acryloxyhexyloxy)-2-fluorobenzoyloxy]biphenyl-4-yl}-1,3-dioxolane-4,5-dicarboxylic acid diethyl ester;

(4R,5R)-2-{4'-[4-(6-acryloxyhexyloxy)-2-cyanobenzoyloxy]biphenyl-4-yl}-1,3-dioxolane-4,5-dicarboxylic acid diethyl ester;

(4R,5R)-2-{4'-[4-(4-acryloxybutyloxy)-2-cyanobenzoyloxy]biphenyl-4-yl}-1,3-dioxolane-4,5-dicarboxylic acid diethyl ester.

EXAMPLE 3

Determination of the Rotary Capacity in a Nematic Matrix

1% by weight of a chiral component I was dissolved in the nematic mixture RO-TN-3010 from Rolic Research Ltd., Switzerland (clearing point 89° C., average molecular weight 292.09), and stirred for 2 hours at room temperature. The homogeneous mixture was then poured into a wedge cell which was provided with parallel rubbed polyimide orientation layers. After a few minutes the mixture orientated and the Grandjean-Cano lines characteristic of the cholesteric phase were observed. The lines were examined under the microscope and the wedge angle of the cell determined. From this was calculated the pitch p of the selective reflection at room temperature.

a) Mixture A with 1% by weight (0.50 mol %) (4R,5R)-2-[4'-(6-acryloxyhexyloxy)biphenyl-4-yl]-1,3-dioxolane-4,5-dicarboxylic acid dibutyl ester, p=−6.6 μm.

b) Mixture A with 1% by weight (0.55 mol %) (4R,5R)-2-[4'-(6-acryloxyhexyloxy)biphenyl-4-yl]-1,3-dioxolane-4,5-dicarboxylic acid diethyl ester, p=−6.6 µm.

c) Mixture A with 1% by weight (0.50 mol %) (4R,5R)-2-(4'-[trans-4-(5-acryloxypentyl)cyclohexyl]biphenyl-4-yl)-1,3-dioxolane-4,5-dicarboxylic acid diethyl ester, p=−7.3 µm.

d) Mixture A with 1% by weight (0.49 mol %) (4R,5R)-2-(4'-[trans-4-(6-acryloxyhexyl)cyclohexyl]biphenyl-4-yl)-1,3-dioxolane-4,5-dicarboxylic acid diethyl ester, p=−7.1 µm.

e) Mixture A with 1% by weight (0.47 mol %) (4R,5R)-2-(4'-[trans-4-(6-acryloxyhexyl)phenyl]cyclohexyl]ethyl]-1,3-dioxolane-4,5-dicarboxylic acid diethyl ester, p=−17.1 µm.

f) Mixture A with 1% by weight (0.45 mol %) (4R,5R)-2-{4'-[trans-4-(6-acryloxyhexyloxy)biphenyl-4-carbonyloxy]phenyl}-1,3-dioxolane-4,5-dicarboxylic acid diethyl ester, p=−10.8 µm.

g) Mixture A with 1% by weight (0.49 mol %) (4R,5R)-2-{4-{4-[trans-4-(3-acryloxypropyl)cyclohexyl]benzoyloxy}phenyl}-1,3-dioxolane-4,5-dicarboxylic acid diethyl ester, p=−8.4 µm.

h) Mixture A with 1% by weight (0.45 mol %) (4R,5R)-2-{4-{4-[trans-4-(3-acryloxypropyl)cyclohexyl]benzoyloxy}phenyl}-1,3-dioxolane-4,5-dicarboxylic acid diethyl ester, p=−8.8 µm.

i) Mixture A with 1% by weight (0.38 mol %) (4R,5R)-2-{4-{4'-[trans-4-(6-acryloxyhexyl)cyclohexyl]biphenyl-4-carbonyloxy}phenyl}-1,3-dioxolane-4,5-dicarboxylic acid diethyl ester, p=−10.5 µm.

j) Mixture A with 1% by weight (0.41 mol %) (4R,5R)-2-{4-{4-[4-(6-acryloxyhexyloxy)benzyloxy]phenyloxycarbonyl}phenyl}-1,3-dioxolane-4,5-dicarboxylic acid diethyl ester, p=−12.6 µm.

EXAMPLE 4

Selectively Reflecting Network; First Method

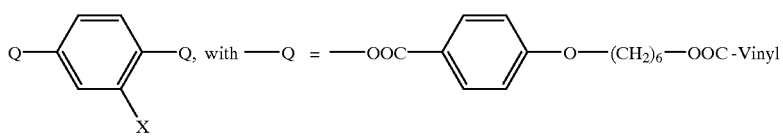

73.4 mg (23.93 mol %) of (4R,5R)-2-[4'-(6-acryloxyhexyloxy)biphenyl-4-yl]-1,3-dioxolane-4,5-dicarboxylic acid dibutyl ester, and 6.3 mg of the inhibitor BHT and 6.3 mg of the photo-initiator IRGACURE™ 369 (4-[4-(2-benzyl-2-dimethyl aminobutanoyl)phenyl] morpholine) were added to a nematic mixture of 236 mg (59.39 mol % of the liquid crystalline proportion) of IIIA, X=COO—$C_5H_{11}$, 44 mg (12.72 mol %) of IIIA, X=$CH_3$, and 14.1 mg (3.96 mol %) of IIIA, X=Cl, and the mixture was melted and stirred intensively for 2 hours at 60° C. The homogeneous cholesteric mixture (clearing point 58° C.) was applied at 45° C. to a glass substrate coated and rubbed with polyimide using a motorised coating device. The coat 6 µm thick formed was tempered for 3 hours at 45° C., and crosslinked in vacuo at 45° C. with the light of a 150 W xenon lamp. A uniformly orientated cholesteric network with a selective reflection at 540 nm was formal.

EXAMPLE 5

Selectively Reflecting Network; Second Method

The mixture described in Example 4 (clearing point 58° C.) was dropped at 90° C. on to a glass substrate coated and rubbed with polyimide. Mylar spacers 20 µm thick were placed on the edge of the substrate. A second heated substrate of similar type was pressed against the first substrate so that a cell of 20 µm thickness was formed. The drop was widened such that it completely filled the 20 µm thick gap. Slow cooling (at 1 K/min) to 45° C., followed by tempering (for 10 hours), resulted in a uniformly orientated cholesteric layer. The cell was irradiated on one side with UV light at the same temperature, and crosslinked in this way. One of the substrate sheets was carefully removed with a scalpel without violating the cholesteric network.

EXAMPLE 6

Selectively Reflecting Network; Third Method

The mixture described in Example 4 was dissolved in 1.5 times (w/w) the quantity of anisole. The solution was intensively stirred for 2 hours at 60° C., filtered through a 0.2 µm filter. then processed into a 5 µm thick film by spin coating (2 minutes at 550 r.p.m.) on a glass substrate coated with polyimide. The film was slowly dried at room temperature, initially becoming turbid. As the drying process progressed a helical arrangement was formed, recognisable by the selective reflection and disappearance of the turbidity. The coat was then stored in vacuo to remove solvent residues, and finally crosslinked under inert gas (Ar) using the light of a 150 W xenon lamp (Osram™).

What is claimed is:

1. A polymerisable optically active compound with the general Formula I:

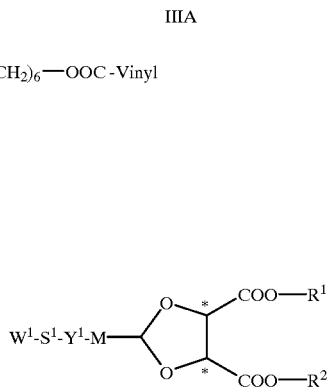

where $W^1$ denotes a polymerisable group with the structure $CH_2=CH-$, $CH_2=CH-Ph-$, $CH_2=CH-COO-$, $CH_2=C(CH_3)-COO-$, $CH_2=C(Cl)-COO-$, $CH_2=C(Ph)-COO-$, $CH_2=CH-COOPh-$, $CH_2=CH-CO-NH-$, $CH_2=CH-CO-NCH_3-$, $CH_2=C(CH_3)-CONH-$, $CH_2=C(CH_3)-CONHCH_3-$, $CH_2=C(Cl)-CONH-$, $CH_2=C$ (Ph)—CONH—, CH$_2$=CH—O—, CH$_2$=CH—OOC—, (Ph)—CH=CH— or

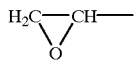

where
(Ph) denotes phenyl, and
Ph denotes 1,4-phenylene;
S$^1$ denotes a spacer unit;
Y$^1$ denotes a single bond or one of the groups —O—, —COO—, —OOC—, OCOO—, —S—, —CONH— or —NHCO—;
M denotes a divalent mesogenic group of Formula (a):

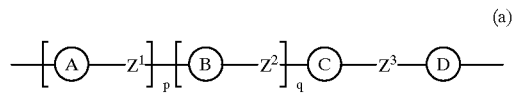

(a)

where:
rings A, B, C, D denote, independently:
unsubstituted 1,4-phenylene or trans-1,4-cyclohexylene, 1,4-phenylene substituted singly or multiply with fluorine, or substituted singly with chlorine, alkyl, alkyloxy, fluorinated alkyl, fluorinated alkoxy, alkenyl, alkenyloxy or cyano,
1,4-phenylene substituted singly or multiply with fluorine, and also substituted singly with chlorine, alkyl, alkyloxy, fluorinated alkyl, fluorinated alkoxy, alkenyl, alkenyloxy or cyano, or
one of rings A, B, C, D denotes unsubstituted pyridine-2,5-diyl, pyrimidine-2,5-diyl, pyrazine-2,5-diyl, thiophene-2,5-diyl or 2,6-naphthalene;
Z$^1$, Z$^2$ and Z$^3$ denote, independently, a single bond, —COO—, —OOC—, —C≡C—, —CH$_2$O—, —OCH$_2$—, —(CH$_2$)$_3$O—, —O(CH$_2$)$_3$—, —(CH$_2$)$_2$— or —(CH$_2$)$_4$—;
p and q denote, independently, 0 or 1; and
R$^1$ and R$^2$ each independently denote a straight chain, branched or cyclic alkyl group containing up to 8 carbon atoms.

2. A compound according to claim 1, of general Formula IA:

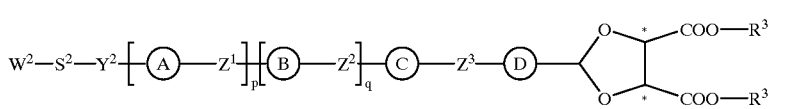

IA where
W$^2$ denotes a polymerisable group with the structure CH$_2$=CH—, CH$_2$=CH—COO—, CH$_2$=C(CH$_3$)—COO—, CH$_2$=C(Cl)—COO—, CH$_2$=CH—CONH—, CH$_2$=C(CH$_3$)—CONH—, CH$_2$=CH—O—, CH$_2$CH—OOC— or

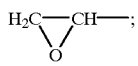

S$^2$ denotes any straight chain or branched alkylene group containing 2 to 20 C atoms,
which group is substituted singly or multiply with fluorine, substituted singly with chlorine or cyano, or substituted singly or multiply with fluorine and also substituted singly with chlorine or cyano, and
which group is either uninterrupted or interrupted singly or doubly by one or more of —O—, —COO—, —OOC—, —CH=CH— or —C≡C—;
Y$^2$ denotes a single bond, —O—, —COO— or —OOC—; and
R$^3$ denotes a straight chain or branched alkyl group containing 1 to 5 carbon atoms.

3. A compound of general Formula IA according to claim 2, where
W$^2$ denotes CH$_2$=CH—COO— or CH$_2$=C(CH$_3$)—COO—;
S$^2$ denotes a straight chain alkylene group containing 2 to 12 C atoms, which group is either uninterrupted or interrupted singly or doubly by —O—;
A, B, C, D denote, independently,
unsubstituted 1,4-phenylene or trans-1,4-cyclohexylene, 1,4-phenylene substituted singly or multiply with fluorine or substituted singly with chlorine, methyl, methoxy or cyano,
1,4-phenylene substituted singly or multiply with fluorine and also substituted singly with chlorine, methyl, methoxy or cyano, or
one of the rings A, B, C, D denotes unsubstituted pyridine-2,5-diyl, pyrimidine-2,5-diyl, pyrazine-2,5-diyl, thiophene-2,5-diyl or 2,6-naphthalene; and
Z$^1$, Z$^2$ and Z$^3$ denote, independently, a single bond, —COO—, —OOC—, —CH$_2$O—, —OCH$_2$—, —(CH$_2$)$_2$— or —C≡C—.

4. A polymerisable liquid crystalline mixture, comprising at least one optically active compound according to claim 1, and at least one liquid crystalline compound of general Formula II incorporating two polymerisable groups,

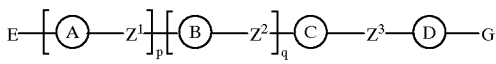

II

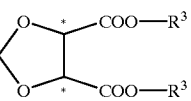

E and G denote, independently, W$^1$—S$^1$—Y$^1$, in which W$^1$, S$^1$ and Y$^1$ have the meaning indicated in claim 1.

5. A polymerisable liquid crystalline mixture as claimed in claim 4, further comprising a liquid crystalline compound of general Formula III incorporating one polymerisable group,

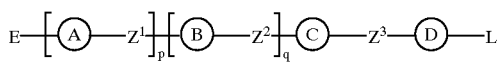

III where

L denotes hydrogen, fluorine, chlorine, cyano, nitro or a straight chain or branched alkyl group containing 1 to 20 carbon atoms, where one or more non-adjacent and non-end-position methylene groups are or are not replaced by any of —O—, —COO—, —OOC—, —S—, —CH=CH or —C≡C—, one or more hydrogens are or are not replaced by fluorine, and one hydrogen is or is not replaced by halogen or cyano.

6. A polymerisable optically active compound as claimed in claim 1, wherein the spacer unit $S^1$ is a straight chain or branched alkylene group containing 2 to 20 C atoms, which group is unsubstituted or substituted singly or multiply with fluorine, substituted singly with chlorine or cyano, or substituted singly or multiply with fluorine and also substituted singly with chlorine or cyano, and which group is either uninterrupted or interrupted singly or doubly by one or more of —O—, —COO—, —OOC—, —CH=CH—, —C≡C—, —NH—, —NHCO—, or —CONH—.

7. A method of making a polymeric cholesteric layer, which comprises providing compounds as claimed in claim 1 with a photoinitiator, orienting the compounds in a helical orientation, and polymerizing the compounds by irradiation with light.

8. A method of making a polymeric cholesteric layer, which comprises providing liquid crystalline compounds with a photoinitiator, providing the liquid crystalline compounds with compounds as claimed in claim 1 as dopants, orienting the liquid crystalline compounds in a helical orientation, and polymerizing the liquid crystalline compounds and compounds of claim 1 by irradiation with light.

9. A method of making a polymeric cholesteric layer, which comprises providing a mixture as claimed in claim 4 with a photoinitiator, orienting the compounds of formula I in a helical orientation, and polymerizing the polymerisable compounds in the mixture by irradiation with light.

10. A polymeric cholesteric layer, which comprises compounds as claimed in claim 1 crosslinked in a helical orientation.

11. An optical component which comprises a polymeric cholesteric layer as claimed in claim 10.

12. An optical component as claimed in claim 11, wherein the optical component is a colour filter.

13. An optical component as claimed in claim 11, wherein the optical component is an optical pass band filter.

14. An optical component as claimed in claim 11, wherein the optical component is a polarizer.

* * * * *